United States Patent
Sakai

(10) Patent No.: US 10,949,663 B2
(45) Date of Patent: Mar. 16, 2021

(54) INFORMATION PROCESSING APPARATUS AND NON-TRANSITORY COMPUTER READABLE MEDIUM STORING PROGRAM

(71) Applicant: FUJI XEROX CO., LTD., Tokyo (JP)

(72) Inventor: Yutaka Sakai, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 106 days.

(21) Appl. No.: 16/260,147

(22) Filed: Jan. 29, 2019

(65) Prior Publication Data

US 2020/0026912 A1    Jan. 23, 2020

(30) Foreign Application Priority Data

Jul. 23, 2018    (JP) .............................. JP2018-137391

(51) Int. Cl.
   *G06K 9/00*    (2006.01)
   *G06K 9/34*    (2006.01)
   *G06Q 10/10*    (2012.01)

(52) U.S. Cl.
   CPC ..... *G06K 9/00456* (2013.01); *G06K 9/00463* (2013.01); *G06K 9/344* (2013.01); *G06Q 10/10* (2013.01)

(58) Field of Classification Search
   CPC ............... G06K 9/00456; G06K 9/344; G06K 9/00463; G06K 2209/01; G06Q 10/10; G06Q 40/12
   See application file for complete search history.

(56) References Cited

U.S. PATENT DOCUMENTS

| | | | | |
|---|---|---|---|---|
| 8,620,079 | B1* | 12/2013 | Rubio | G06K 9/00442 382/173 |
| 2007/0237128 | A1* | 10/2007 | Patel | H04L 45/00 370/351 |
| 2008/0294586 | A1* | 11/2008 | Lim | G06F 21/51 706/47 |
| 2009/0204607 | A1* | 8/2009 | Matsuzawa | G06F 16/93 |
| 2009/0265762 | A1* | 10/2009 | Evanitsky | G06F 21/6245 726/3 |
| 2012/0272188 | A1* | 10/2012 | Kunitake | G06F 21/6209 715/811 |
| 2016/0216923 | A1* | 7/2016 | Willamowski | G06F 3/1285 |
| 2016/0350754 | A1 | 12/2016 | Satoh et al. | |
| 2017/0169103 | A1* | 6/2017 | Juneja | G06F 16/313 |

FOREIGN PATENT DOCUMENTS

| | | |
|---|---|---|
| JP | 2010061551 | 3/2010 |
| JP | 2016021147 | 2/2016 |
| JP | 2016224545 | 12/2016 |

* cited by examiner

*Primary Examiner* — John B Strege
(74) *Attorney, Agent, or Firm* — JCIPRNET

(57) ABSTRACT

An information processing apparatus includes a storage unit that previously stores a classification rule corresponding to an attribute of an applicant, an acquisition unit that acquires content of an electronic document from an image of the document, and a setting unit that reads the classification rule corresponding to the attribute of the applicant of the document from the storage unit, and sets a classification item of the document based on the content of the document, which is acquired by the acquisition unit, and the classification rule which is read from the storage unit.

20 Claims, 10 Drawing Sheets

FIG. 4

EXAMPLE OF USER INFORMATION

| USER ID | USER NAME | DEPARTMENT | RESPONSIBILITY | OFFICE ORGANIZATION |
|---|---|---|---|---|
| 1210001 | USER C | SALES DEPARTMENT | SALES | HEAD OF DEPARTMENT |
| 1210002 | USER A | SALES DEPARTMENT | SALES | DUTY SECTION CHIEF |
| 1210003 | USER B | VEHICLE DEVELOPMENT DEPARTMENT | DEVELOPMENT | SECTION CHIEF |
| 1210004 | USER D | PLANNING DEPARTMENT | PLANNING | |
| 1210005 | USER E | ENGINE DEVELOPMENT DEPARTMENT | DEVELOPMENT | ENGINEER |

FIG. 5A   EXAMPLE OF JOURNALIZING RULE   FIG. 5B

VEHICLE DEVELOPMENT DEPARTMENT

| PAYMENT CONTENT | ACCOUNT TITLE |
|---|---|
| GASOLINE FARE | TESTING MATERIAL COSTS |
| TAXI FARE | DATE COSTS |
| COMPONENT EXPENSES | TRANSPORTATION COSTS |
| OOO EXPENSES | DEVELOPMENT COSTS |
| FOOD AND BEVERAGE EXPENSES | CONFERENCE COSTS |

SALES DEPARTMENT

| PAYMENT CONTENT | ACCOUNT TITLE |
|---|---|
| GASOLINE FARE | VEHICLE COSTS |
| TAXI FARE | DATE COSTS |
| FOOD AND BEVERAGE EXPENSES | DATE COSTS |
| △△ EXPENSES | CONSUMABLES COSTS |
| BOOKCASE EXPENSES | OFFICE SUPPLIES COSTS |

RECEIPT

NO: 0123456
DATE OF ISSUE: 5/12/2018

BILLED TO OOO, INC.

6259 YEN

NAMES OF GOODS: GASOLINE FARE
RECEIVED ABOVE AMOUNT

△△△OIL SALES, INC.
〒123-4567 O-△-□ MINATOKU IN TOKYO
TEL: 03-4567-8901
FAX: 03-4567-8902

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-137391 filed Jul. 23, 2018.

BACKGROUND

(i) Technical Field

The present invention relates to an information processing apparatus and a non-transitory computer readable medium storing a program.

(ii) Related Art

JP2010-061551A discloses an electronic application document system which checks whether or not an image of a paper document, which is scanned for application, is appropriately recognized on an image forming apparatus, thereby reducing workloads due to wrong application.

JP2016-021147A discloses an accounting apparatus which automatically journalizes each received transaction in a specified account title based on description of content of the transaction.

JP2016-224545A discloses an expense management system which generates expense application information in order to apply for a charge as expense based on acquired payment information and additional information which is information related to a situation in which the charge is paid.

SUMMARY

Aspects of non-limiting embodiments of the present disclosure relate to an information processing apparatus and a non-transitory computer readable medium storing a program, which are capable of setting a classification item of a document with higher accuracy, compared to a case of setting the classification item of the document based on only content of an electronic document.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: a storage unit that previously stores a classification rule corresponding to an attribute of an applicant; an acquisition unit that acquires content of an electronic document from an image of the document; and a setting unit that reads the classification rule corresponding to the attribute of the applicant of the document from the storage unit, and sets a classification item of the document based on the content of the document, which is acquired by the acquisition unit, and the classification rule which is read from the storage unit.

BRIEF DESCRIPTION OF THE DRAWINGS

Exemplary embodiment(s) of the present invention will be described in detail based on the following figures, wherein:

FIG. 4 is a diagram illustrating an example of user information which is stored in a user information storage unit 34;

FIGS. 5A and 5B are diagrams illustrating examples of journalizing rules which are stored in a journalizing rule storage unit 33;

FIG. 7 is a diagram illustrating a receipt 71 which is used as an example in order to describe the operation of the relay server 10 according to the exemplary embodiment of the present invention;

DETAILED DESCRIPTION

Hereinafter, an exemplary embodiment of the present invention will be described in detail with reference to the accompanying drawings.

Figure 1:
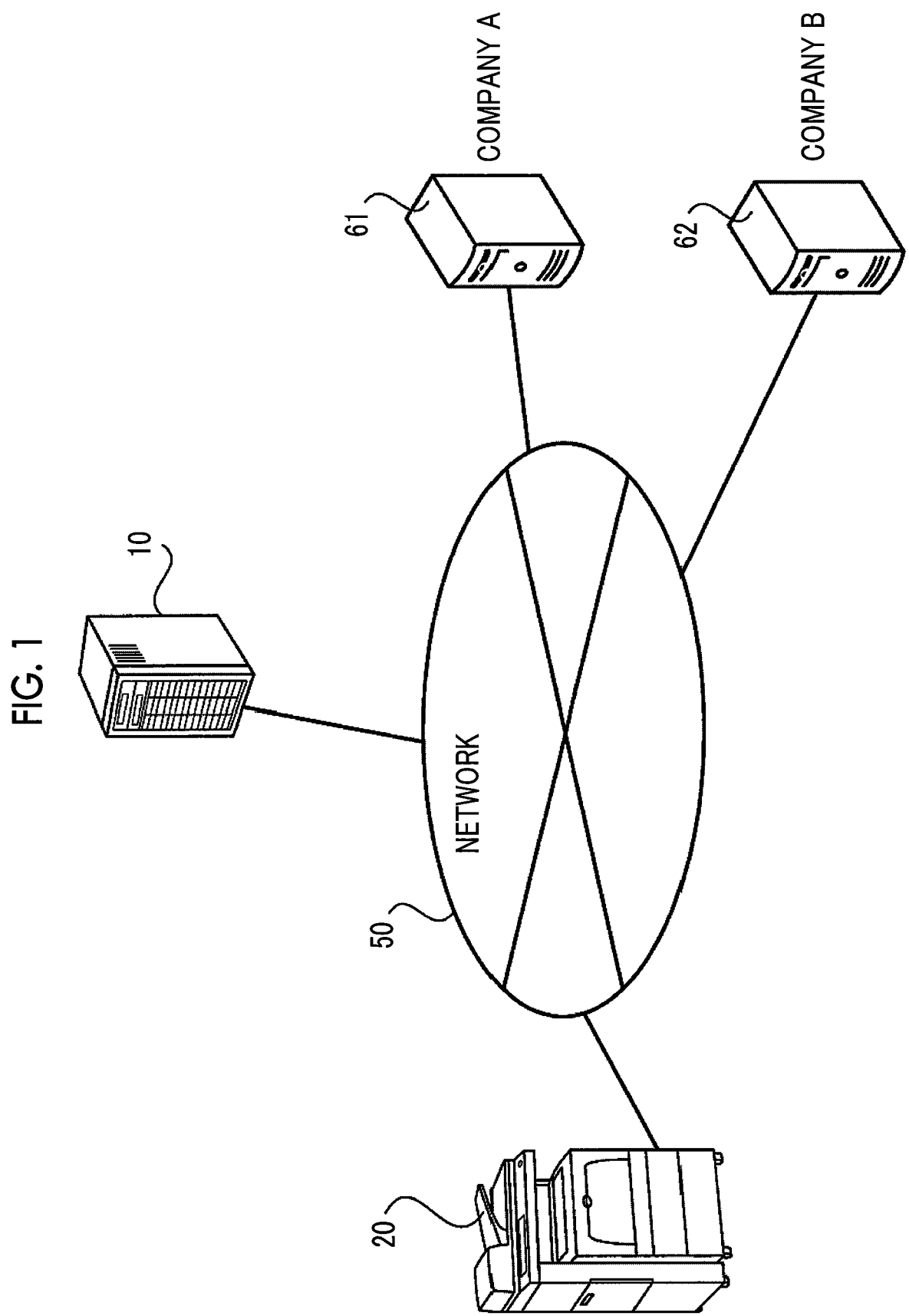
FIG. 1 is a diagram illustrating a system configuration of an information processing system according to an exemplary embodiment of the present invention.

FIG. 1 is a diagram illustrating a system configuration of an information processing system according to an exemplary embodiment of the present invention.

As illustrated in FIG. 1, the information processing system according to the exemplary embodiment of the present invention is configured with a relay server 10, an image forming apparatus 20, and receipt preservation servers 61 and 62, which are connected to each other through a network 50.

The information processing system according to the exemplary embodiment is a system for electronalizing and preserving a national tax-related document such as a receipt. Here, the national tax-related document includes various documents, on which preservation duties are imposed, on the tax laws such as the corporation tax laws, the income tax laws, and the consumption tax laws.

Meanwhile, although a case where a receipt image, which is acquired by electronalizing the receipt, will be described in the exemplary embodiment below, it is also possible to similarly apply the present invention to a case where a document other than the receipt is electronalized and preserved.

The image forming apparatus 20 is an apparatus, so-called a multifunction peripheral, which is set for an office or the like of a user and which includes a plurality of functions such as a print function, a scan function, a copy function, and a facsimile function. In the exemplary embodiment, the image forming apparatus 20 functions as an image reading apparatus which converts various documents, such as the receipt, into images through electronalization.

The receipt preservation servers 61 and 62 are storage devices that are used to store and preserve the image of the electronic receipt. Here, the receipt preservation server 61 is operated by a company A and the receipt preservation server 62 is operated by a company B. Furthermore, description will be performed in such a way that, in a case where receipt data is registered in the receipt preservation server 61 which is operated by the company A, costs do not occur whenever the receipt data is registered and, in a case where the receipt data is registered in the receipt preservation server 62 which is operated by the company B, the costs occur whenever the receipt data is registered.

The relay server 10 is an information processing apparatus that receives a preservation application of the receipt image scanned in the image forming apparatus 20, that sets an account title with respect to the receipt image on which the preservation application is performed, and that makes a preservation processing request with respect to any of the receipt preservation servers 61 and 62 as the receipt data.

Meanwhile, although description is performed using a case where an applicant scans the receipt by manipulating the image forming apparatus 20 and applies for the preservation of an electronic receipt image in the exemplary embodiment, it is possible to apply for preservation of a picture image of the receipt, which is acquired by imaging the receipt using a mobile terminal device such as a smart phone.

Figure 2:
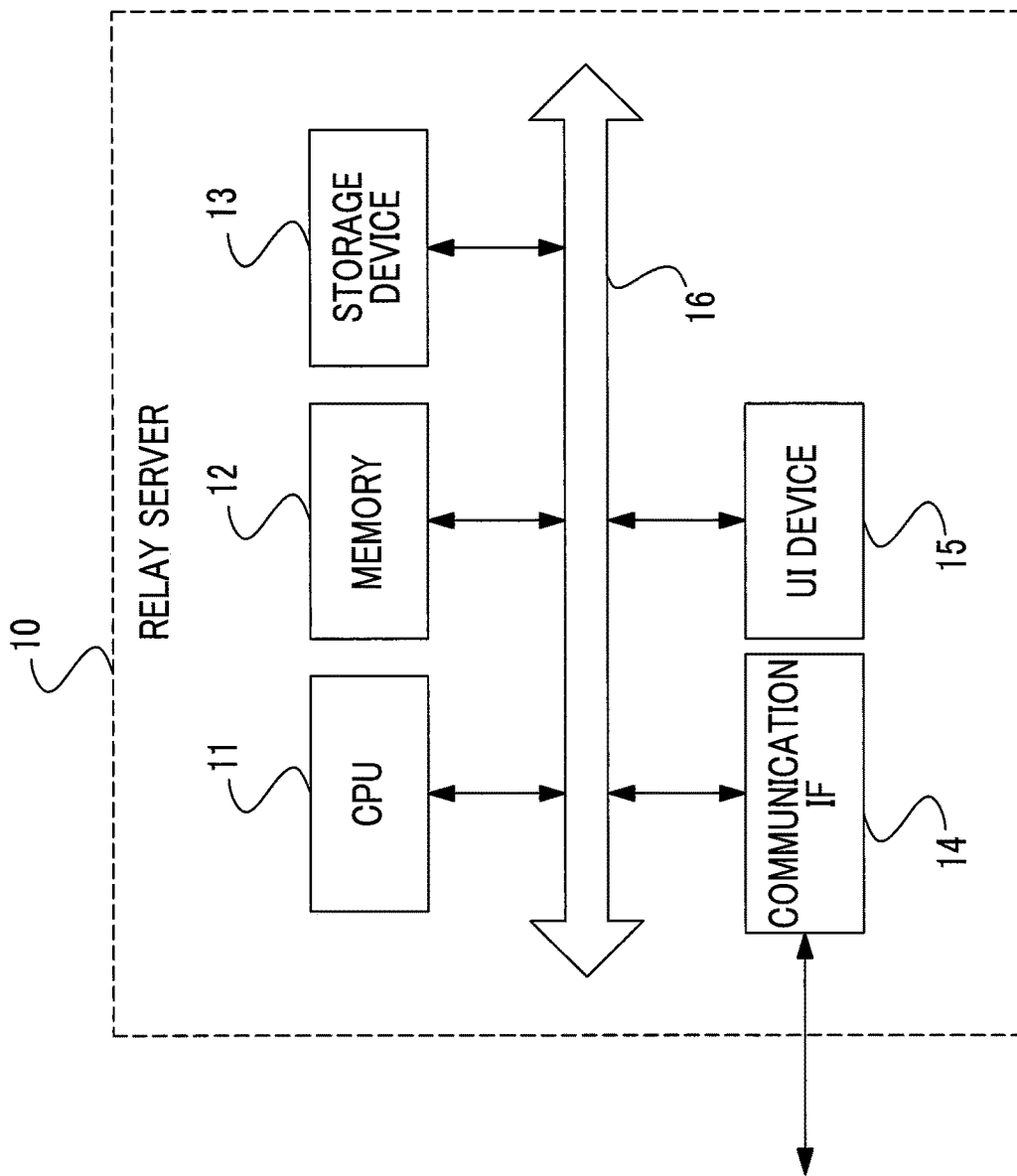
FIG. 2 is a block diagram illustrating a hardware configuration of a relay server 10 according to the exemplary embodiment of the present invention.

Subsequently, a hardware configuration of the relay server 10 in an image forming system according to the exemplary embodiment is illustrated in FIG. 2.

As illustrated in FIG. 2, the relay server 10 includes a CPU 11, a memory 12, a storage device 13, such as a hard disk (HDD), a communication interface (IF) 14 which transmits and receives data to and from an external device or the like through the network 50, and a user interface (UI) device 15 which includes a touch panel, a liquid crystal display, or a keyboard. The components are connected to each other through a control bus 16.

The CPU 11 performs a prescribed process based on a control program stored in the memory 12 or the storage device 13, and controls an operation of the relay server 10. Meanwhile, although description is performed in such a way that the CPU 11 reads and executes the control program stored in the memory 12 or the storage device 13 in the exemplary embodiment, it is possible to store the control program in a storage medium, such as a CD-ROM, and to supply the control program to the CPU 11.

Figure 3:
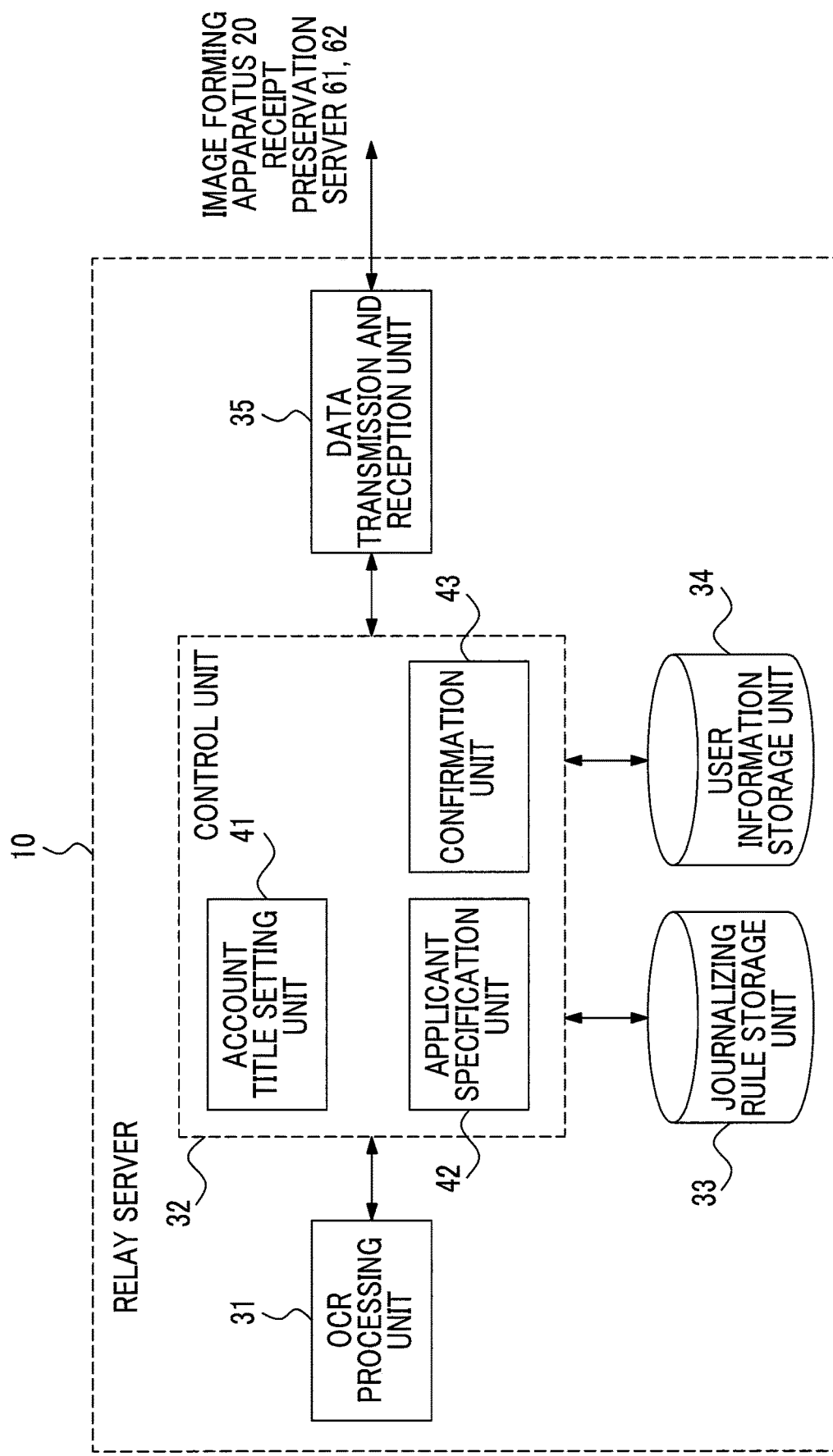
FIG. 3 is a block diagram illustrating a functional configuration of the relay server 10 according to the exemplary embodiment of the present invention.

FIG. 3 is a block diagram illustrating a functional configuration of the relay server 10 which is realized in a case where the control program is executed.

As illustrated in FIG. 3, the relay server 10 according to the exemplary embodiment includes an Optical Character Reading (OCR) processing unit 31, a control unit 32, a journalizing rule storage unit 33, a user information storage unit 34, and a data transmission and reception unit 35.

In addition, the control unit 32 controls the operation of the relay server 10, and includes an account title setting unit 41, an applicant specification unit 42, and a confirmation unit 43.

The data transmission and reception unit 35 acquires the electronic receipt image from the image forming apparatus 20. In addition, the data transmission and reception unit 35 transmits the receipt data, on which the account title is set with respect to the electronic receipt image, to any of designated receipt preservation server of the receipt preservation servers 61 and 62.

In addition, in a case where an approval of the user who is the applicant is necessary, the data transmission and reception unit 35 transmits the receipt data to the image forming apparatus 20 before transmitting the receipt data to the receipt preservation server 61 or 62 to register the receipt data.

The OCR processing unit 31 acquires content of the receipt from the image of the electronic receipt. Specifically, the OCR processing unit 31 acquires information of a receipt issuer, information relevant to payment content, and information of a recipient from the image of the electronic receipt.

The user information storage unit 34 stores attribute information for each user who is the applicant that applies for registration of the receipt as user information. Specifically, the attribute information of the user includes various pieces of information such as a user ID, a user name, a department, a responsibility field, and an office organization.

An example of the user information stored in the user information storage unit 34 is illustrated in FIG. 4. As illustrated in FIG. 4, it is understood that the pieces of information, such as the user ID, the user name, the department, the responsibility field, and the office organization, are stored as the user information for each user.

The journalizing rule storage unit 33 previously stores a journalizing rule, which corresponds to an attribute of the applicant, as a classification rule. Here, the attribute of the applicant is, for example, any of one or more combinations of the department, the responsibility field, and the office organization, which are acquired from the above-described user information, of the applicant.

Examples of the journalizing rule, which is stored in the journalizing rule storage unit 33, are illustrated in FIGS. 5A and 5B. FIG. 5A illustrates an example of a journalizing rule which is applied in a case where the department of the applicant is a "vehicle development department" and FIG. 5B illustrates an example of the journalizing rule which is applied in a case where the department of the applicant is a "sales department".

As being understood in a case where FIG. 5A is compared with FIG. 5B, it is understood that, even in a case of identical payment content "gasoline fare", the account title is "testing material costs" in the journalizing rule illustrated in FIG. 5A and the account title is "vehicle costs" in the journalizing rule illustrated in FIG. 5B.

In addition, even in a case of identical payment content "food and beverage expenses", the account title is "conference costs" in the journalizing rule illustrated in FIG. 5A and the account title is "entertainment costs" in the journalizing rule illustrated in FIG. 5B.

The account title setting unit 41 reads the journalizing rule, which corresponds to the attribute of the applicant on the receipt, from the journalizing rule storage unit 33, and sets the account title (classification item) of the receipt based on the content of the receipt, which is acquired by the OCR processing unit 31, and the journalizing rule which is read from the journalizing rule storage unit 33.

Here, the account title is a title which is used in a case where an accounting process is performed on occurring costs, and is a title which indicates a name of displayed amount used for double entry bookkeeping, financial statements, or the like.

The applicant specification unit 42 specifies the applicant of the receipt using the user information which is acquired from a login of the applicant. In addition, the applicant specification unit 42 may specify the applicant of the receipt based on the information of the recipient (addressee information) on the receipt which is acquired by the OCR processing unit 31.

That is, the account title setting unit 41 reads the journalizing rule, which corresponds to the attribute of the applicant specified by the applicant specification unit 42, from the journalizing rule storage unit 33, and sets the account title of the receipt based on the issuer information acquired by the OCR processing unit 31, information related to the payment content, and the journalizing rule read from the journalizing rule storage unit 33.

In a case where the image of the document, to which the account title is set, is stored in the receipt preservation server 61 or 62, which is the storage device, and a certain specified condition is satisfied, the confirmation unit 43 checks with the applicant whether or not to store the image of the receipt in the receipt preservation server 61 or 62.

Specifically, in a case where costs occur in order to store the image of the receipt in the receipt preservation server 61 or 62, the confirmation unit 43 checks with the applicant whether or not to store the image of the receipt in the receipt preservation server 61 or 62.

In addition, in a case where setting is performed such that previous check is performed in a case where the image of the receipt is stored in the receipt preservation server 61 or 62, the confirmation unit 43 may check with the applicant whether or not to store the image of the receipt in the receipt preservation server 61 or 62.

Furthermore, in a case where recognition accuracy of an OCR process (optical character recognizing process) with respect to the image of the receipt in the OCR processing unit 31 does not satisfy a preset reference, the confirmation unit 43 may check with the applicant whether or not to store the image of the receipt in the receipt preservation server 61 or 62. For example, in a case where the recognition accuracy of the OCR process in the OCR processing unit 31 is less than 60%, the confirmation unit 43 checks with the applicant whether or not to store the image of the receipt in the receipt preservation server 61 or 62.

Subsequently, the operation of the relay server 10 in the information processing system according to the exemplary embodiment will be described in detail with reference to the accompanying drawings.

Figure 6:
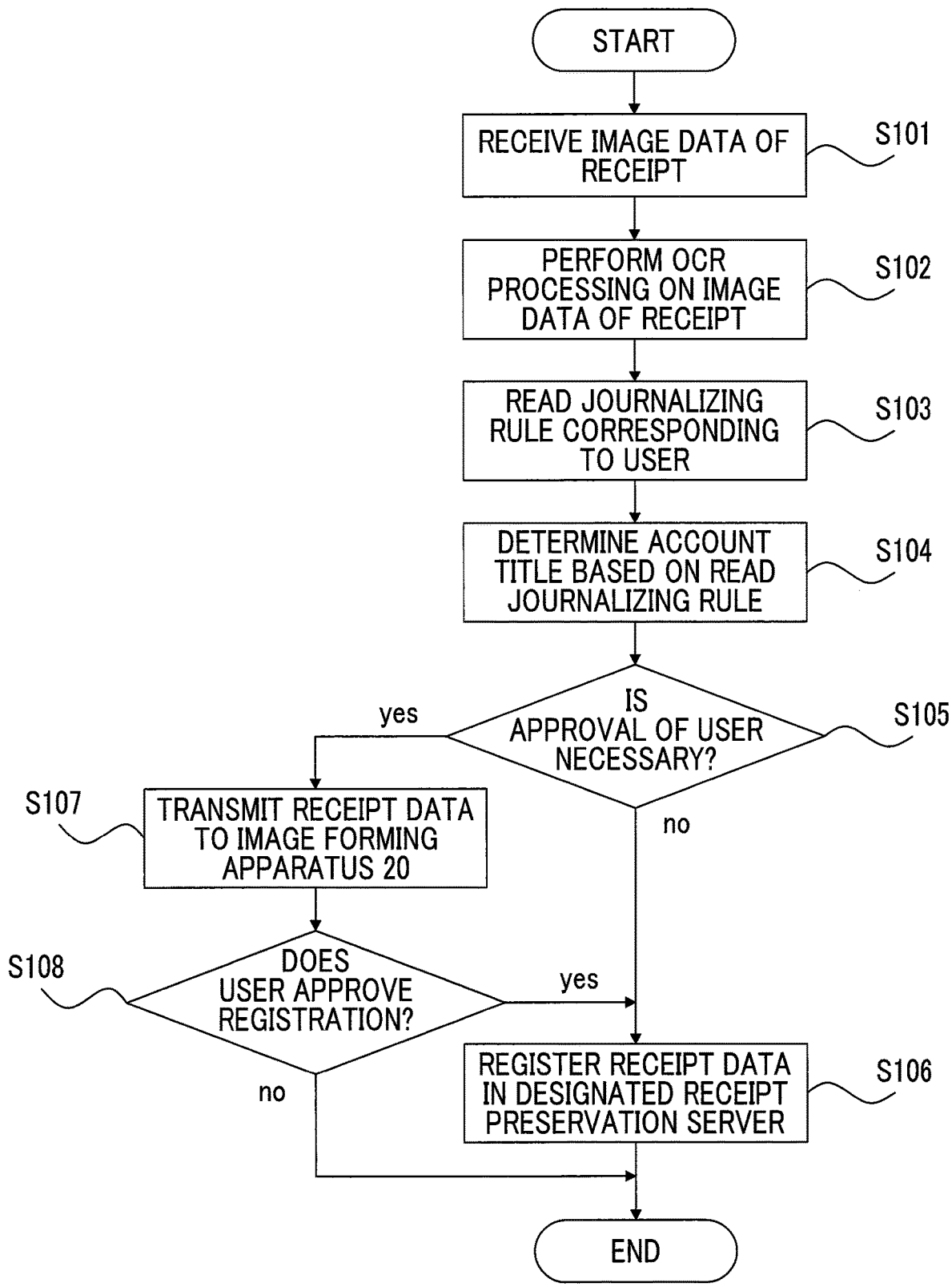
FIG. 6 is a flowchart illustrating an operation of the relay server 10 according to the exemplary embodiment of the present invention.

First, an operation of receiving scan data of the receipt from the image forming apparatus 20 and preserving the scan data in the receipt preservation server 61 or 62 by the relay server 10 will be described with reference to a flowchart of FIG. 6.

Meanwhile, in the description below, a case where, for example, a receipt 71 as illustrated in FIG. 7 is scanned and preserved in the image forming apparatus 20 will be described.

First, in a case where image data of the receipt 71, which is scanned in the image forming apparatus 20, is received in the data transmission and reception unit 35 (step S101), the control unit 32 transmits the image data to the OCR processing unit 31 and performs the OCR process (step S102). Furthermore, in a case where the OCR process is performed in the OCR processing unit 31, amount information or information, such as the payment content, is acquired from the image data of the receipt.

Meanwhile, in the receipt 71 illustrated in FIG. 7, the addressee information is a name of company. Therefore, the applicant specification unit 42 specifies the applicant based on login information in the image forming apparatus 20.

Subsequently, the account title setting unit 41 reads an attribute of the user, who is specified as the applicant by the applicant specification unit 42, from the user information storage unit 34.

Furthermore, the account title setting unit 41 reads the journalizing rule, which corresponds to the attribute of the user read from the user information storage unit 34, from the journalizing rule storage unit 33 (step S103).

As a result, the account title setting unit 41 determines an account title of the receipt 71 based on the journalizing rule, which is read from the journalizing rule storage unit 33, or information such as the payment content of the receipt 71 (step S104).

For example, in a case where the applicant is a user A, a department of the user A is the "sales department" in the user information illustrated in FIG. 4, and thus the account title setting unit 41 reads the journalizing rule, which corresponds to the "sales department" illustrated in FIG. 5B, from the journalizing rule storage unit 33. Furthermore, since the payment content of the receipt 71 is "gasoline fare", the account title setting unit 41 sets the account title of the receipt 71 to the "vehicle costs" based on the payment content and the journalizing rule illustrated in FIG. 5B.

Figure 8:
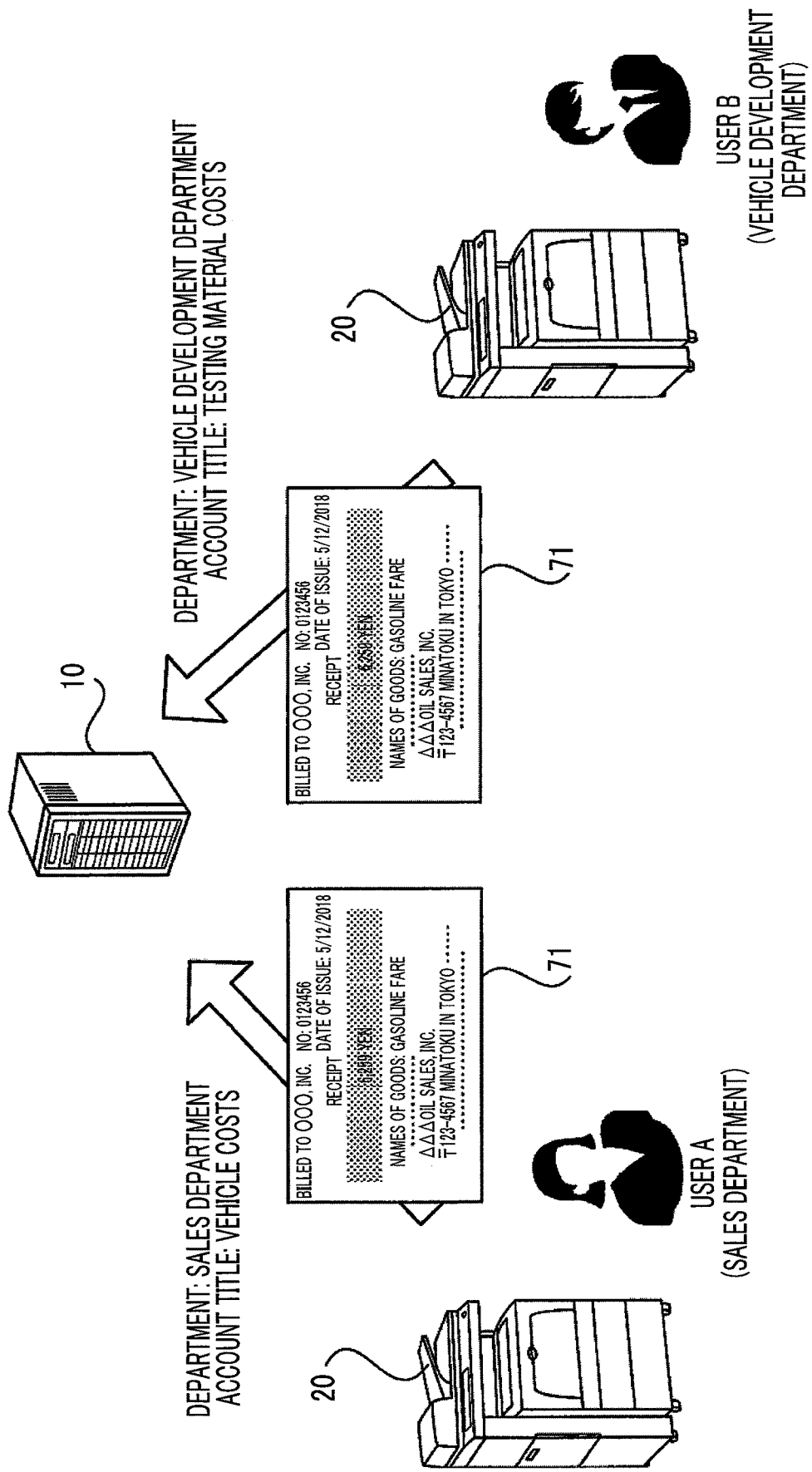
FIG. 8 is a diagram illustrating a case where an account title to be set differs depending on whether an applicant is a user A or a user B even in a case where registration of an identical receipt 71 is applied.

Meanwhile, the account titles are set using different journalizing rules because of the different attributes of the user who is the applicant, as described above. Therefore, even in a case where the identical receipt 71 is applied for registration, the account title to be set is different depending on whether the applicant is the user A or the user B, as illustrated in FIG. 8.

Specifically, as described above, in a case where the user A who belongs to the sales department applies for the registration of the receipt 71 by scanning the receipt 71 using the image forming apparatus 20 and transmitting the receipt 71 to the relay server 10, the account title is set based on the journalizing rule corresponding to the "sales department", and thus the account title "vehicle costs" is set.

However, in a case where the user B who belongs to the vehicle development department scans the receipt 71 applies for the registration of the receipt 71 by scanning the receipt 71 using the image forming apparatus 20 and transmitting the receipt 71 to the relay server 10, the account title is set based on the journalizing rule corresponding to the "vehicle development department", and thus the account title "testing material costs" is set.

Furthermore, in a case where the approval of the user is not necessary before the receipt data is registered (no in step S105), the receipt data, to which the account title is set, is transmitted from the data transmission and reception unit 35 to the designated receipt preservation server of the receipt preservation servers 61 and 62, and is registered therein (step S106).

Meanwhile, in a case where the approval of the user is necessary before the receipt data is registered (yes in step S105), the confirmation unit 43 once transmits the receipt data to the image forming apparatus 20 through the data transmission and reception unit 35 (step S107).

Figure 9:
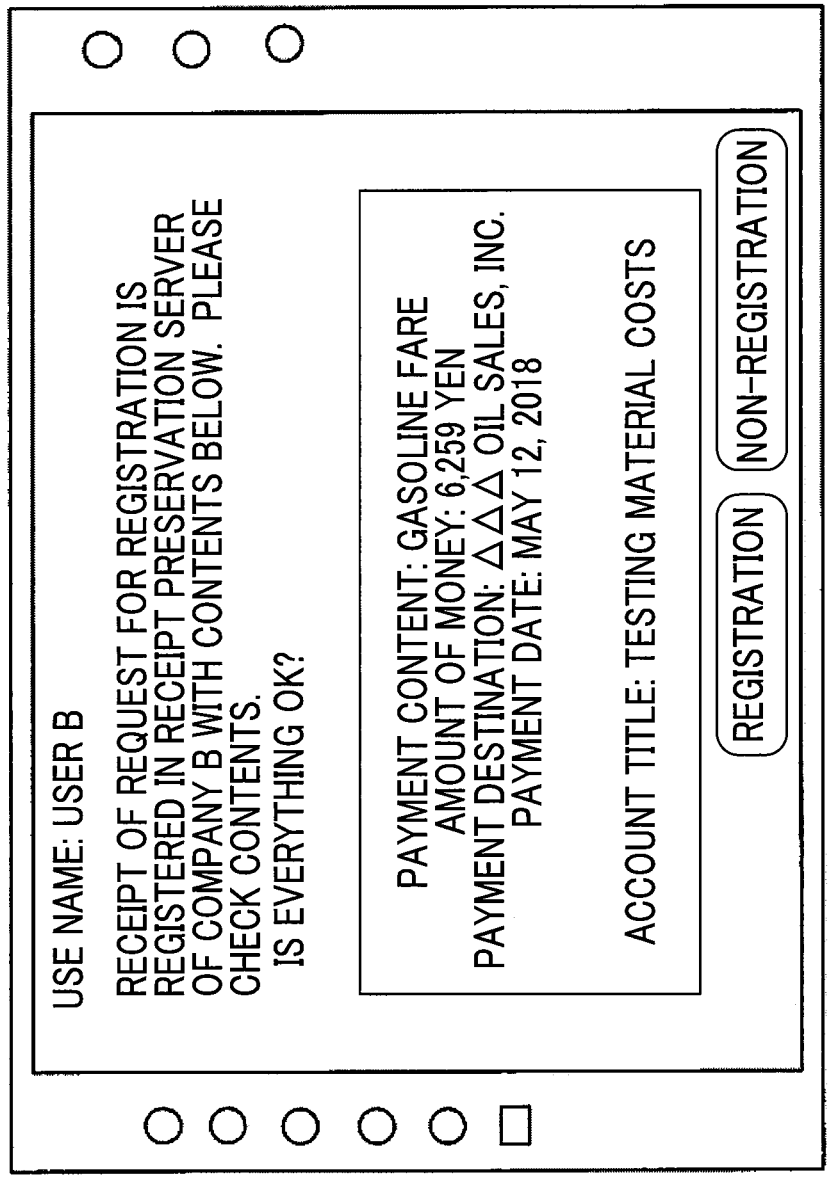
FIG. 9 is a diagram illustrating an example of display content which is displayed on a manipulation panel of an image forming apparatus 20 in a case where a user is requested to approve registration of receipt data.

Furthermore, in the image forming apparatus 20, for example, display content as illustrated in FIG. 9 is displayed on the manipulation panel, and the user who is the applicant is requested to approve to display and register the content of the receipt data.

Furthermore, in a case where a manipulation which indicates that the user approves the registration of the receipt data is performed in the image forming apparatus 20 (yes in step S108), the receipt data to which the account title is set is transmitted from the data transmission and reception unit 35 to the designated receipt preservation server of the receipt preservation servers 61 and 62, and is registered therein (step S106).

Meanwhile, in a case where a manipulation which indicates that the user does not approve the registration of the receipt data is performed in the image forming apparatus 20 (no in step S108), a receipt data registration process is not performed.

Meanwhile, an example of a case where the user is requested to give an approval before the receipt data registration process is performed will be described with reference to FIG. 10.

Figure 10:
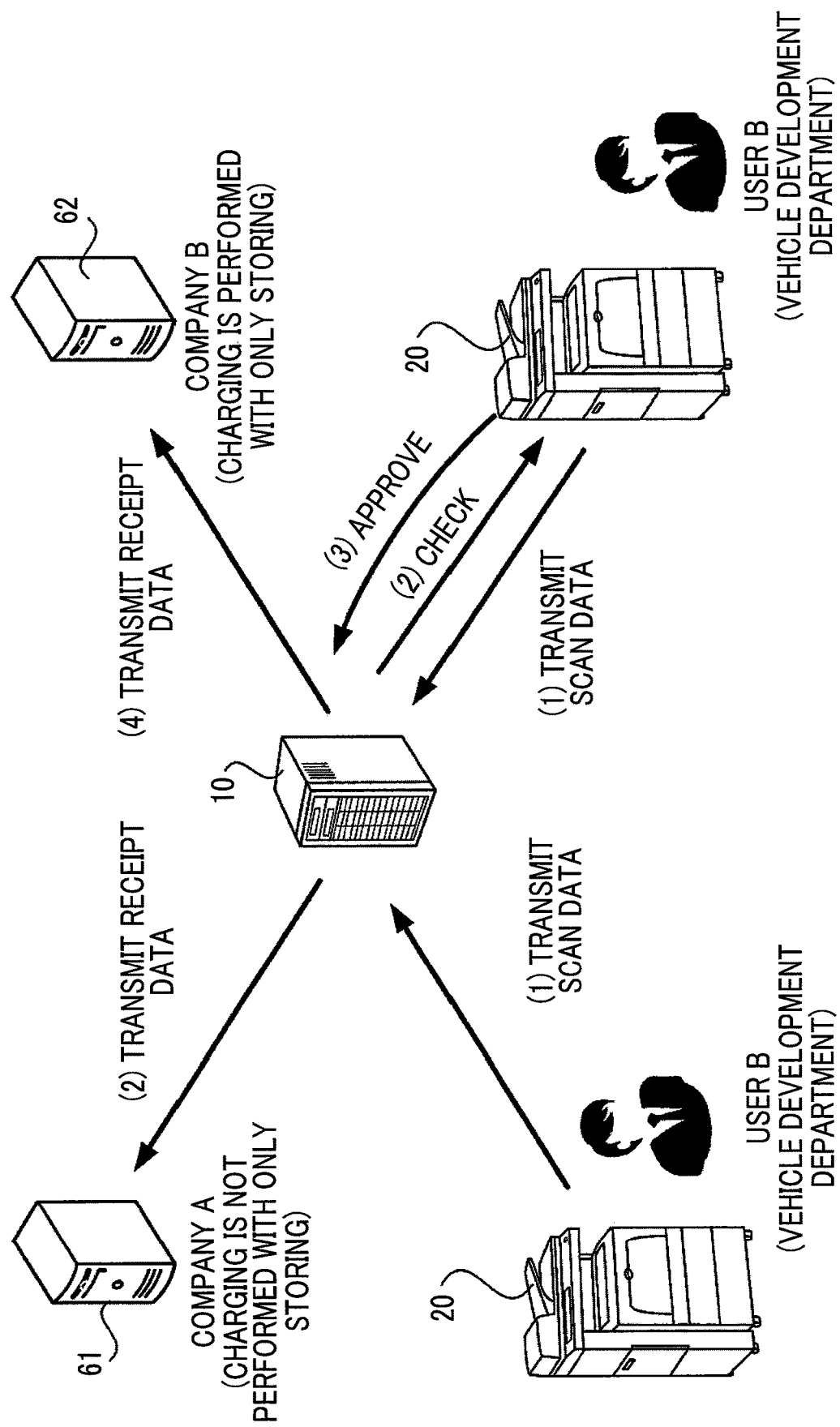
FIG. 10 is a diagram illustrating an example of a case where the user is requested to give an approval before a receipt data registration process is performed.

In FIG. 10, a case will be described where the confirmation unit 43 requests the user to give the approval before the receipt data is registered in a case where costs occur in order to store the image of the receipt, but does not request the user to give the approval before the receipt data is registered and performs the registration process without change in a case where the costs do not occur.

Here, description will be performed while assuming that setting is performed such that the costs do not occur for every registration process in a case where the receipt data is registered in the receipt preservation server 61 as described above and the costs occur for every registration process in a case where the receipt data is registered in the receipt preservation server 62.

That is, in a case where the user registers the receipt data in the receipt preservation server 61 and the receipt image, which is scanned from the image forming apparatus 20, is set in the relay server 10, the registration process is performed in such a way that the receipt data, in which the account title is set, is transmitted from the relay server 10 to the receipt preservation server 61.

However, in a case where the user registers the receipt data in the receipt preservation server 62 and the receipt image, which is scanned from the image forming apparatus 20, is set in the relay server 10, the receipt data is once transmitted from the relay server 10 to the image forming apparatus 20 and is checked with the user after the account title is set in the relay server 10. Furthermore, in a case where the user checks registration content and approves the registration process in the image forming apparatus 20, the registration process is performed in such a way that the relay server 10 transmits the receipt data to the receipt preservation server 61.

In addition, in a case where setting, in which the approval of the user is necessary before the registration process is performed for the whole receipt data, is performed and a check rate which is acquired through the OCR process is lower than a preset value, the above-described approval of the user may be requested before the receipt data registration process is performed.

In a case where a check process is performed by the user before the receipt data registration process is performed as described above and any of errors, such as inappropriate setting of the account title, exists, it is possible to cancel the registration process performed by the user or to perform a correction process by the user. As a result, it is possible to prevent the registration of the receipt data, which is wrong and inappropriate, from being performed.

Modification Example

In the exemplary embodiment, description is performed using the case where the account title of the receipt is set. However, the present invention is not limited thereto and it is possible to apply the present invention in the same manner even in a case where the classification item is set by performing classification on various processes other than the receipt based on the preset classification rule.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a non-transitory storage medium configured to store a classification rule corresponding to an attribute of an applicant;
an optical character reading (OCR) processor configured to acquire a content of an electronic document from an image of the document; and
a hardware processor configured to read the classification rule corresponding to the attribute of the applicant of the document from the non-transitory storage medium, and set a classification item of the document based on the content of the document, which is acquired by the OCR processor, and the classification rule which is read from the non-transitory storage medium,
wherein the OCR processor is further configured to acquire issuer information, information related to payment content, and recipient information of the receipt from an image of the electronic receipt.

2. The information processing apparatus according to claim 1,
wherein the hardware processor is further configured to specify the applicant of the document from addressee information in the document, which is acquired by the OCR processor,
wherein the hardware processor reads the classification rule corresponding to the attribute of the applicant who is specified from the non-transitory storage medium.

3. The information processing apparatus according to claim 1,
wherein the hardware processor is further configured to specify the applicant of the document using user information acquired from a login of the applicant,
wherein the hardware processor reads the classification rule corresponding to the attribute of the applicant who is specified from the non-transitory storage medium.

4. The information processing apparatus according to claim 1,
wherein the attribute of the applicant is any one or more combinations of a department, a responsibility field, and an office organization of the applicant.

5. The information processing apparatus according to claim 2,
wherein the attribute of the applicant is any one or more combinations of a department, a responsibility field, and an office organization of the applicant.

6. The information processing apparatus according to claim 1,
wherein the hardware processor is further configured to check with the applicant whether or not to store the image of the document in a non-transitory storage device in a case where the image of the document, in which the classification item is set, is stored in the non-transitory storage device and a certain specific condition is satisfied.

7. The information processing apparatus according to claim 2,
wherein the hardware processor is further configured to check with the applicant whether or not to store the image of the document in a non-transitory storage device in a case where the image of the document, in which the classification item is set, is stored in the non-transitory storage device and a certain specific condition is satisfied.

8. The information processing apparatus according to claim 3,
wherein the hardware processor is further configured to check with the applicant whether or not to store the image of the document in a non-transitory storage device in a case where the image of the document, in which the classification item is set, is stored in the non-transitory storage device and a certain specific condition is satisfied.

9. The information processing apparatus according to claim 4,
wherein the hardware processor is further configured to check with the applicant whether or not to store the image of the document in a non-transitory storage device in a case where the image of the document, in which the classification item is set, is stored in the non-transitory storage device and a certain specific condition is satisfied.

10. The information processing apparatus according to claim 5,
wherein the hardware processor is further configured to check with the applicant whether or not to store the image of the document in a non-transitory storage device in a case where the image of the document, in which the classification item is set, is stored in the non-transitory storage device and a certain specific condition is satisfied.

11. The information processing apparatus according to claim 6,
wherein the hardware processor checks with the applicant whether or not to store the image of the document in the non-transitory storage device in a case where costs occur in order to store the image of the document in the non-transitory storage device.

12. The information processing apparatus according to claim 7,
wherein the hardware processor checks with the applicant whether or not to store the image of the document in the non-transitory storage device in a case where costs occur in order to store the image of the document in the non-transitory storage device.

13. The information processing apparatus according to claim 8,
wherein the hardware processor checks with the applicant whether or not to store the image of the document in the non-transitory storage device in a case where costs occur in order to store the image of the document in the non-transitory storage device.

14. The information processing apparatus according to claim 9,
wherein the hardware processor checks with the applicant whether or not to store the image of the document in the non-transitory storage device in a case where costs occur in order to store the image of the document in the non-transitory storage device.

15. The information processing apparatus according to claim 10,
wherein the hardware processor checks with the applicant whether or not to store the image of the document in the non-transitory storage device in a case where costs occur in order to store the image of the document in the non-transitory storage device.

16. The information processing apparatus according to claim 6,
wherein the hardware processor perform checking with the applicant whether or not to store the image of the document in the non-transitory storage device in a case where setting is performed such that the checking is performed before the image of the document is stored to the non-transitory storage device.

17. The information processing apparatus according to claim 6,
wherein the hardware processor checks with the applicant whether or not to store the image of the document in the non-transitory storage device in a case where recognition accuracy of an optical character recognizing process with respect to the image of the document does not satisfy a preset reference.

18. The information processing apparatus according to claim 1,
wherein the document is a receipt, the classification rule is a journalizing rule, and the classification item is an account title.

19. The information processing apparatus according to claim 18,
wherein the hardware processor specifies the applicant of the receipt from the recipient information which is acquired by the OCR processor, and
wherein the hardware processor reads a journalizing rule corresponding to the attribute of the applicant specified from the non-transitory storage medium, and sets the account title of the receipt based on the issuer information and the information related to the payment content, which are acquired by the OCR processor, and the journalizing rule which is read from the non-transitory storage medium.

20. A non-transitory computer readable medium storing a program causing a computer to perform:
acquiring content of an electronic document from an image of the document;
reading a classification rule corresponding to an attribute of an applicant of the document from a non-transitory storage medium that stores the classification rule corresponding to the attribute of the applicant;
setting a classification item of the document based on the acquired content of the document and the classification rule which is read from the non-transitory storage medium; and
acquiring issuer information, information related to payment content, and recipient information of the receipt from an image of the electronic receipt.

* * * * *